(12) United States Patent
McClaskey (10) Patent No.: US 7,721,677 B1
(45) Date of Patent: May 25, 2010

(54) GOURD NESTING PLACE FOR PURPLE MARTINS

(76) Inventor: David R. McClaskey, 38 Ravens Point, Lake St. Louis, MO (US) 63367

( * ) Notice: Subject to any disclaimer, the term of this patent is extended or adjusted under 35 U.S.C. 154(b) by 334 days.

(21) Appl. No.: 11/746,344

(22) Filed: May 9, 2007

(51) Int. Cl.
A01K 31/14 (2006.01)
A01K 31/00 (2006.01)

(52) U.S. Cl. .................... 119/435; 119/329

(58) Field of Classification Search ........... 119/329, 119/428, 429, 430, 431, 432, 433, 434, 435, 119/459, 464, 468, 51.01, 52.2, 57.8; D30/108, D30/110, 111, 124, 125
See application file for complete search history.

(56) References Cited

U.S. PATENT DOCUMENTS

| | | | | |
|---|---|---|---|---|
| 2,260,018 | A | * 10/1941 | Garthus | 119/435 |
| 3,177,849 | A | * 4/1965 | Isenberg | 119/435 |
| 3,757,742 | A | * 9/1973 | Schlegel | 119/432 |
| 3,783,831 | A | 1/1974 | Patliff | |
| 4,515,108 | A | 5/1985 | Rankin, Jr. | |
| 4,702,198 | A | 10/1987 | Holyoak | |
| 4,889,075 | A | * 12/1989 | Byrns | 119/435 |
| 5,490,480 | A | * 2/1996 | Dumond | 119/57.9 |
| 5,560,314 | A | 10/1996 | Wessinger | |
| 5,740,762 | A | 4/1998 | Bennett | |
| 5,943,981 | A | 8/1999 | Chrisco | |
| 6,009,837 | A | 1/2000 | McClaskey | |
| 6,405,679 | B1 | 6/2002 | Sonnek | |
| 6,513,454 | B1 | 2/2003 | Snyder | |
| 6,516,750 | B1 | 2/2003 | Heinzeroth | |
| 2005/0072370 | A1 | 4/2005 | Braden | |
| 2006/0065206 | A1 | 3/2006 | Carter | |

FOREIGN PATENT DOCUMENTS

DE 3632887 A1 * 4/1988

OTHER PUBLICATIONS

The Backyard Bird Company, Super Gourds-Best Seller!, website: http://www.backyardbird.com/supergourd.html, printed from the Internet on May 9, 2007.
Carroll Industries, Purple Martin Gourds, website: http://www.purplemartingourds.com/martins.htm, printed from the Internet on May 9, 2007.
BEST NEST.COM, Naturline Single 11 Gourd, website: http://www.bestnest.com/bestnest/RTProduct.asp?SKU=NL-1001-10, printed from the internet on May 9, 2007.
Gardenocity, Purple Martin "Bo Gourd", website: http://www.yardlover.com/products.php?pid=77713030, printed from the internet on May 9, 2007.

* cited by examiner

Primary Examiner—T. Nguyen
(74) Attorney, Agent, or Firm—Grace J. Fishel (57) ABSTRACT

A plastic artificial gourd for use as a nesting place for purple martins. An outer shell has a neck and an inspection hole and is formed in halves. The front half has an entrance hole for the martins. An inner core is provided with an inspection hole and entrance hole in registry with those in the outer shell. Drainage holes are provided in the bottom of the outer shell and the inner core and the neck is provided with ribs forming an air space when a cap is attached to the neck. The gourd is ventilated though the drainage holes and out the air space under the cap. The inside of the outer shell and inner core may be textured to provide the martins a good footing.

22 Claims, 6 Drawing Sheets

GOURD NESTING PLACE FOR PURPLE MARTINS

BACKGROUND OF THE INVENTION

1. Field of the Invention

The present invention relates to plastic gourd-shaped housing for use in attracting purple martins to nest.

2. Brief Description of the Prior Art

Purple martins started nesting in natural gourds a long time ago. Many purple martin "landlords" believe that the shape of the gourds still appeals to the birds more strongly than any other type of martin house. But natural gourds are expensive to buy, laborious to prepare and hard to clean out. Hence natural gourds are not preferred by most purple martin "landlords."

There are plastic gourds which address some of the problems associated with natural gourds. One such product is a one-piece, blow molded gourd that is sold under the trademark SuperGourd. The SuperGourd has drainage holes in the bottom and a threaded access port. One problem with the SuperGourd is that the inside of the nest is slick. Some think that abnormalities may develop if the baby purple martins slip while moving about in the nesting compartment. Another problem with the SuperGourd is that the access port is round and when a nest camera is inserted through the cap it is difficult to thread the cap on the access port such that the camera is right-side-up. The SuperGourd is also hard to clean out.

There are also plastic gourds which are molded in sections. See for example U.S. Pat. No. 3,783,831 to Patliff which describes a two-piece plastic gourd for purple martins formed of mating upper and lower sections. The Patliff gourd, however, has no access port such that it difficult for a "landlord" to do nest checks. Commercially a two-piece plastic gourd divided along a vertical plane into a front half with an access opening and a closed rear half is sold by Carroll Industries. This product, like the Patliff gourd, has drainage holes in the bottom and no access port. Another two-piece plastic gourd is sold under the tradename Natureline. This gourd is like the gourd sold by Carroll Industries except that the company offers different snap-in door assemblies such that the "landlord" has a choice of hole shapes. Removal of the door assembly also makes clean out of the nesting compartment easier. The Natureline gourd has a vent cap cover which can be lifted for ventilation but, like the gourd sold by Carroll Industries, no access port. While the vent cap improves ventilation when it is open, it also admits rain which may result in a loss of the featherless baby martins if they become chilled in a damp nest. Additionally, all of the prior art two-piece gourds are slick on the inside.

Some "landlords" believe that purple martins prefer a nesting compartment with a darkened interior. While it is possible to paint the inside of a plastic gourd such those sold by Carroll Industries or Natureline with black paint this removes some of the advantage of using a plastic gourd, i.e., little or no maintenance other than nest clean out.

From the standpoint of a purple martin and from its "landlord," a plastic gourd would ideally have a number of features: Non-slip interior, wide access port for nest checks and nest clean out, clip-on access cover so that a nest camera is easy to insert and good ventilation without wetting the nest. Other desirable features include easy assembly of the gourd, easy positioning of the gourd on a wire or mounting pole such that the ingress and egress hole faces an open flight path, choice of entrance hole shapes, optional black inner core and so forth.

Up until now, no purple martin plastic gourd offered all these features, some features not at all and others not in combination.

BRIEF SUMMARY OF THE INVENTION

In view of the above, it is an object of the present invention to provide a plastic gourd with a non-slip interior and a wide access port for nest checks and nest clean out. It is another object to provide a plastic gourd that has a clip-on access cover so that a nest camera is easy to insert and good ventilation is provided without wetting the nest. It is also an object to provide a gourd that is easy to assemble and to position on a wire or mounting pole such that the entrance hole faces an open flight path. Other objects and features of the invention will be in part apparent and in part pointed out hereinafter.

In accordance with the invention, an artificial gourd for use as a nesting place for purple martins has an outer shell formed as a front half and a rear half divided by a vertical plane. An inspection hole is formed along the vertical plane. The front half includes an entrance hole. An inner core may be fitted into the outer shell. The inner core like the outer shell has a front half and a rear half divided by a vertical plane. Preferably the outer shell is a light pastel or white and the inner core is a dark color.

The artificial gourd is provided with numerous features such as a textured surface on the inside of outer shell and inner core. Other features include a bay window structure on the front half of the outer shell for use in assembling the gourd and for attachment of a door assembly with the entrance hole. A canopy may be provided on the inside of the outer shell above the entrance hole or an interior porch may be provided. A neck of the outer shell may be provided with ribs such that an air space is formed between a cap and the neck when the cap is slipped over the ribs and so forth.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which:

FIG. 8 is an exploded perspective view of the interior of a front half of the outer shell where the neck is a separate element; and, FIG. 9 is a perspective view similar to FIG. 8 but showing the front half of the outer shell and the neck assembled.

DETAILED DESCRIPTION OF THE INVENTION

Referring to the drawings more particularly by reference character, reference numeral 10 refers to an artificial gourd for use as a nesting compartment for purple martins in accordance with the present invention. In major part, gourd 10 as best seen in FIG. 2 includes an outer shell 12 and a cap 14 and may include an inner core 16.

Figure 1:
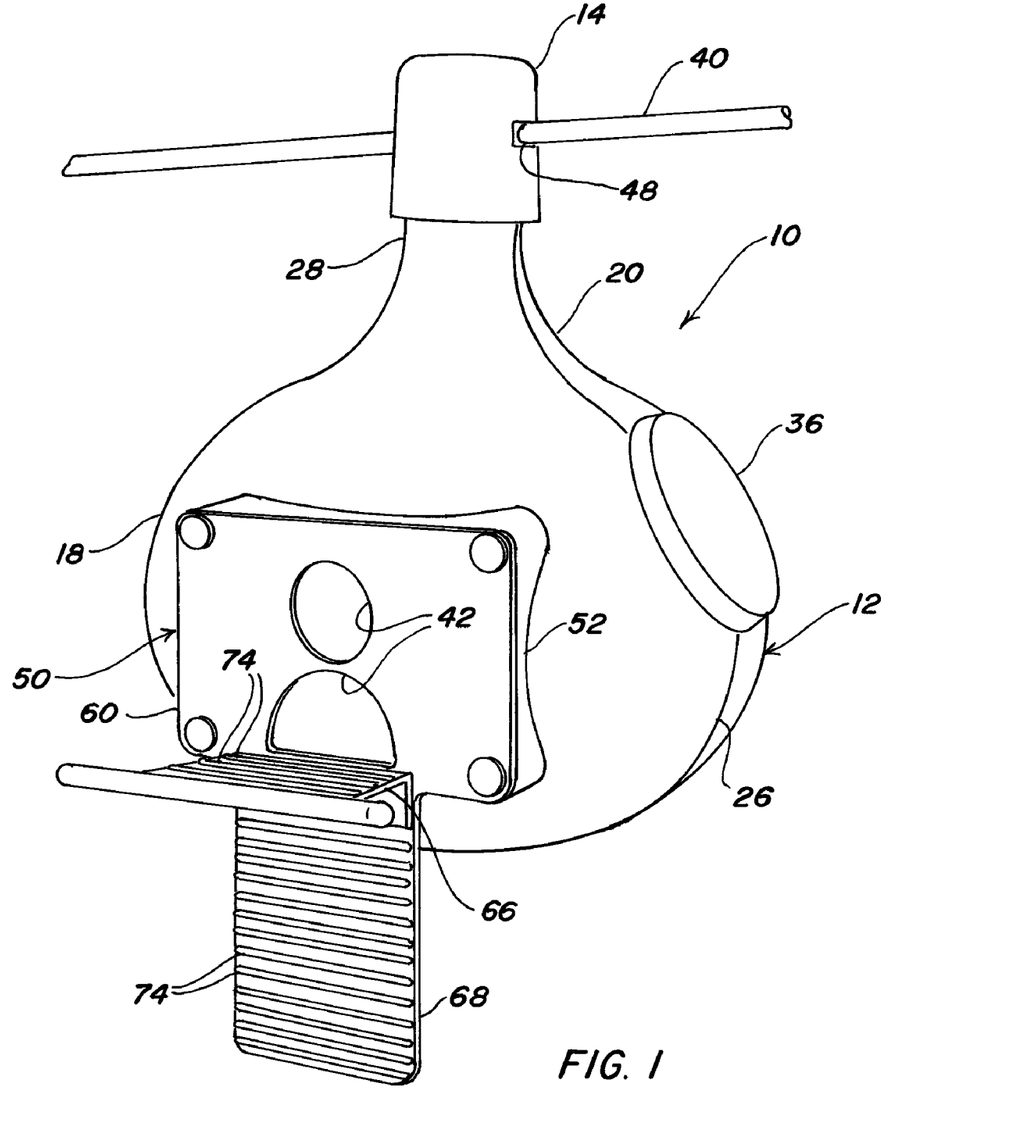
FIG. 1 is a perspective view of a gourd in accordance with the present invention shown strung on a wire or rod.
Figure 2:
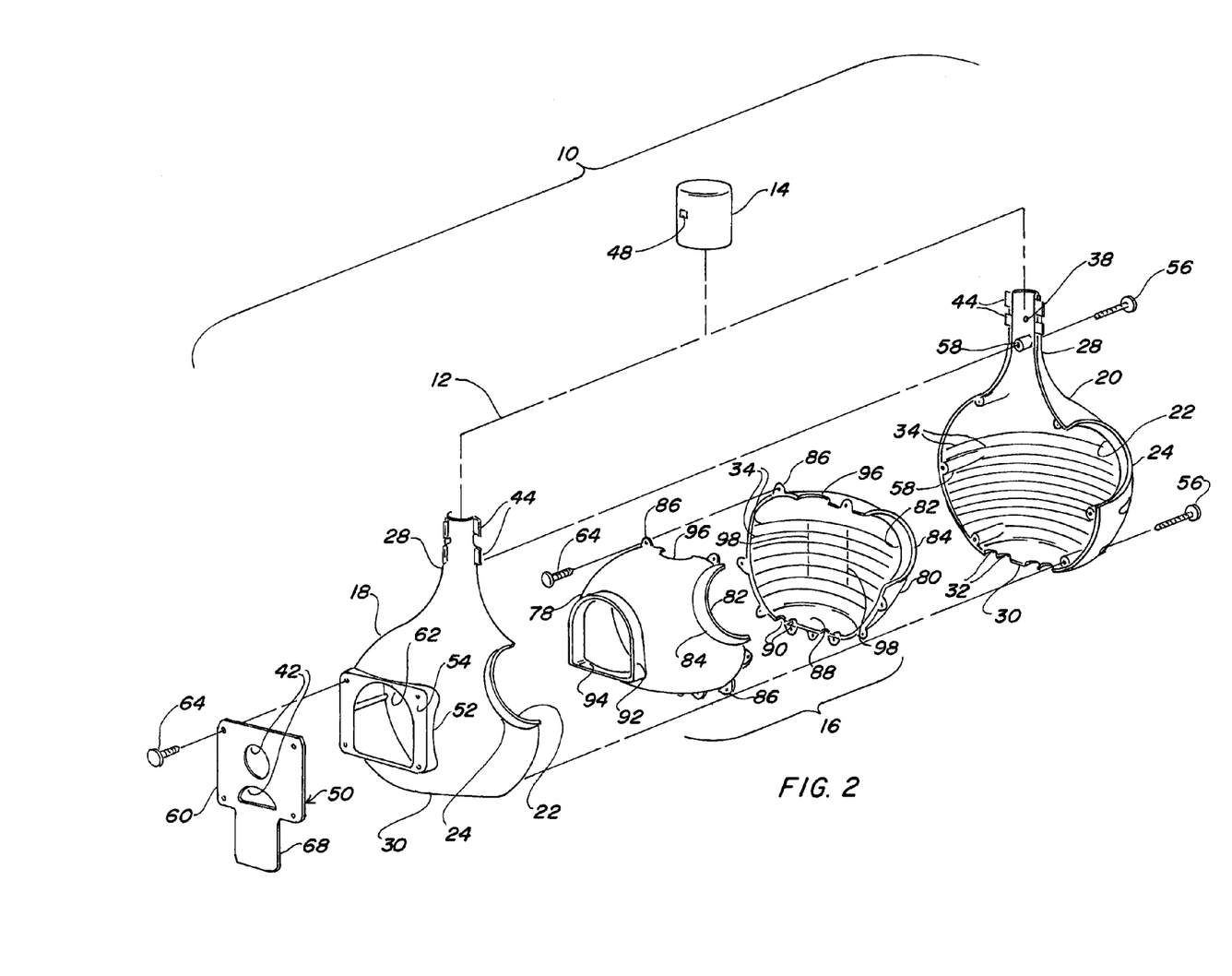
FIG. 2 is an exploded perspective view of the gourd illustrated as having an outer shell and an inner core.

With continuing reference to FIG. 2, outer shell 12 includes a front half 18 and a rear half 20 divided by a vertical plane passing through an inspection hole 22 with an outwardly extending collar 24. Front and rear halves 18, 20 mate along the vertical plane to form a substantially water tight seam 26. Seam 26 may be a tongue-in-groove joint, overlapped joint or the like and may include a gasket or o-ring, if desired. Outer shell 12 is gourd shaped with a neck 28 and a generally flattened bottom 30. Drainage holes 32 (FIGS. 2 and 3) may be provided in flattened bottom 30. As illustrated, drainage holes 32 may be formed along the vertical plane with half of each hole molded into each of front and rear halves 18, 20. The inside of front and rear halves 18, 20 may be textured such that the inhabitants of the nesting compartment will not slip during ingress and egress. For this purpose corduroy-like ridges 34 may be provided to give the martins a good grip. Collar 24 could be threaded but a snap-on cap 36 (FIGS. 1 and 4-6) may be preferably provided as a cover for inspection hole 22. It is also preferred that inspection hole 22 be oval in shape to better conform to a person's hand.

Figure 3:
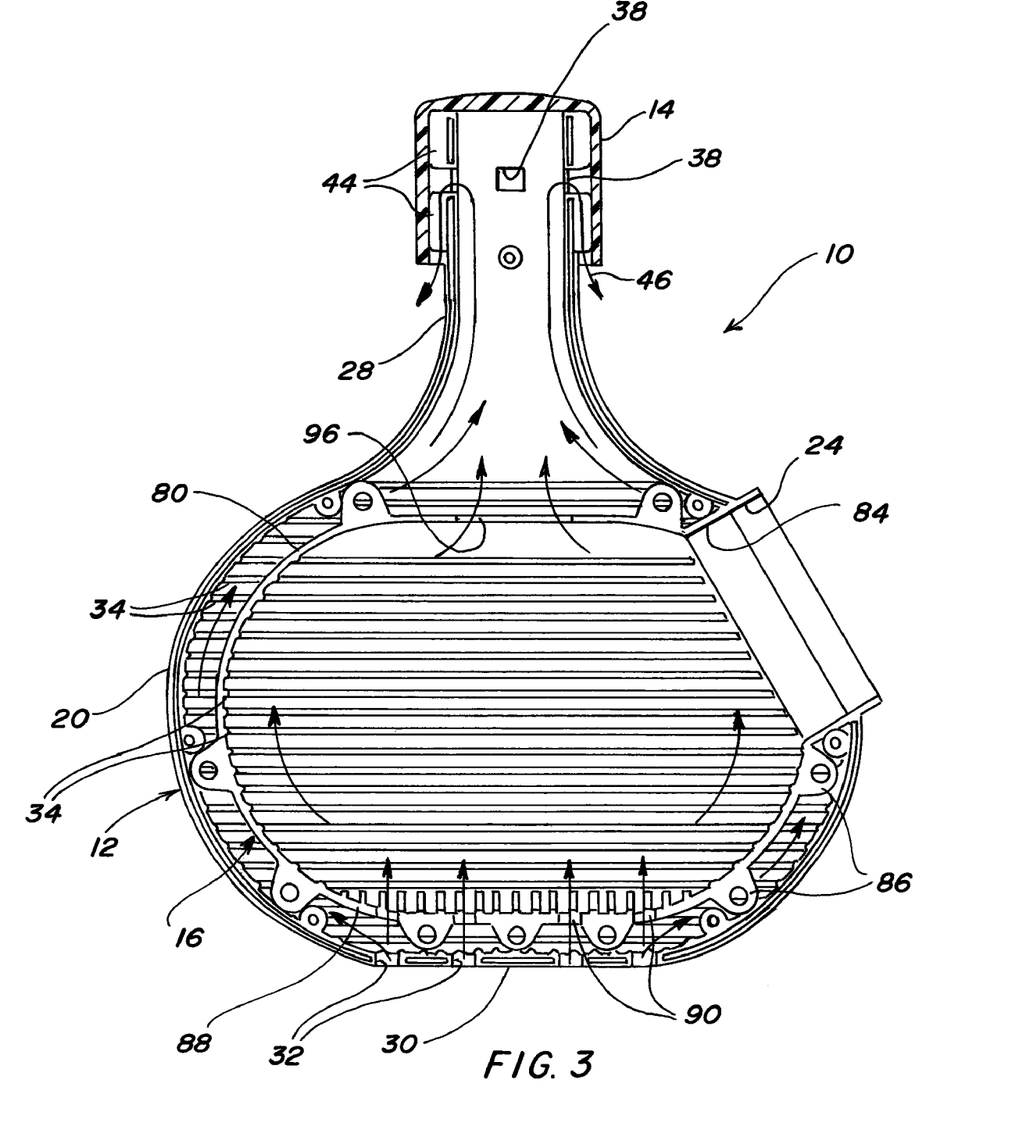
FIG. 3 is an elevational view of the interior of the rear half of the outer shell and inner core.

Neck 28 includes a transverse hole 38 (FIGS. 2 and 3) through which a wire or rod 40 may be passed for hanging gourd 10. Preferably at least two transverse holes 38 are provided, orthogonal to each other such that it is easy to position gourd 10 on a wire or rod 40 with an entrance hole 42 facing an open flight path without drilling neck 28 with another hole 38. Neck 28 also includes a plurality of ribs 44 which provide an air space 46 (FIG. 3) between cap 14 and neck 28 when cap 14 is installed on neck 28 as shown in FIG. 3. Cap 14 may be formed as a cylinder with a closed bottom. At least one transverse hole 48 is provided in cap 14 for registry with a selected one of transverse holes 38 in neck 28 for passage of wire or rod 40. Entrance hole 42 may be formed as a part of outer shell 12 or provided as a separate door assembly 50.

Figure 7:
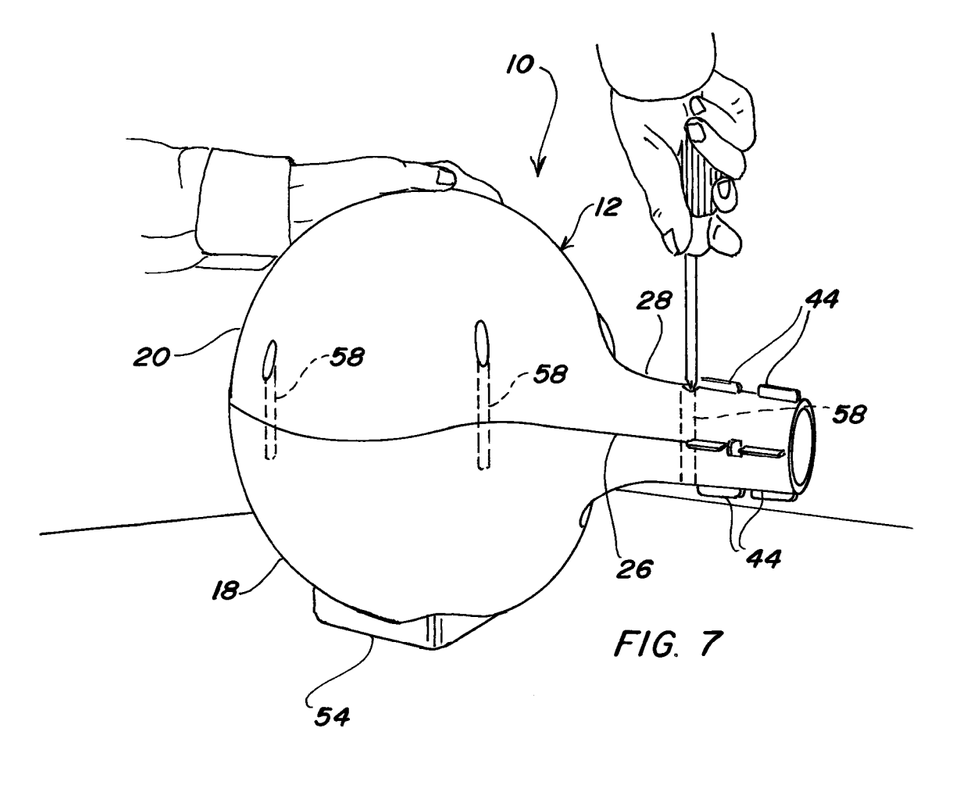
FIG. 7 is a perspective view showing assembly of the gourd with the gourd resting on a flat outer surface provided in a bay window structure on the front half of the outer shell.
Figures 8, 9:
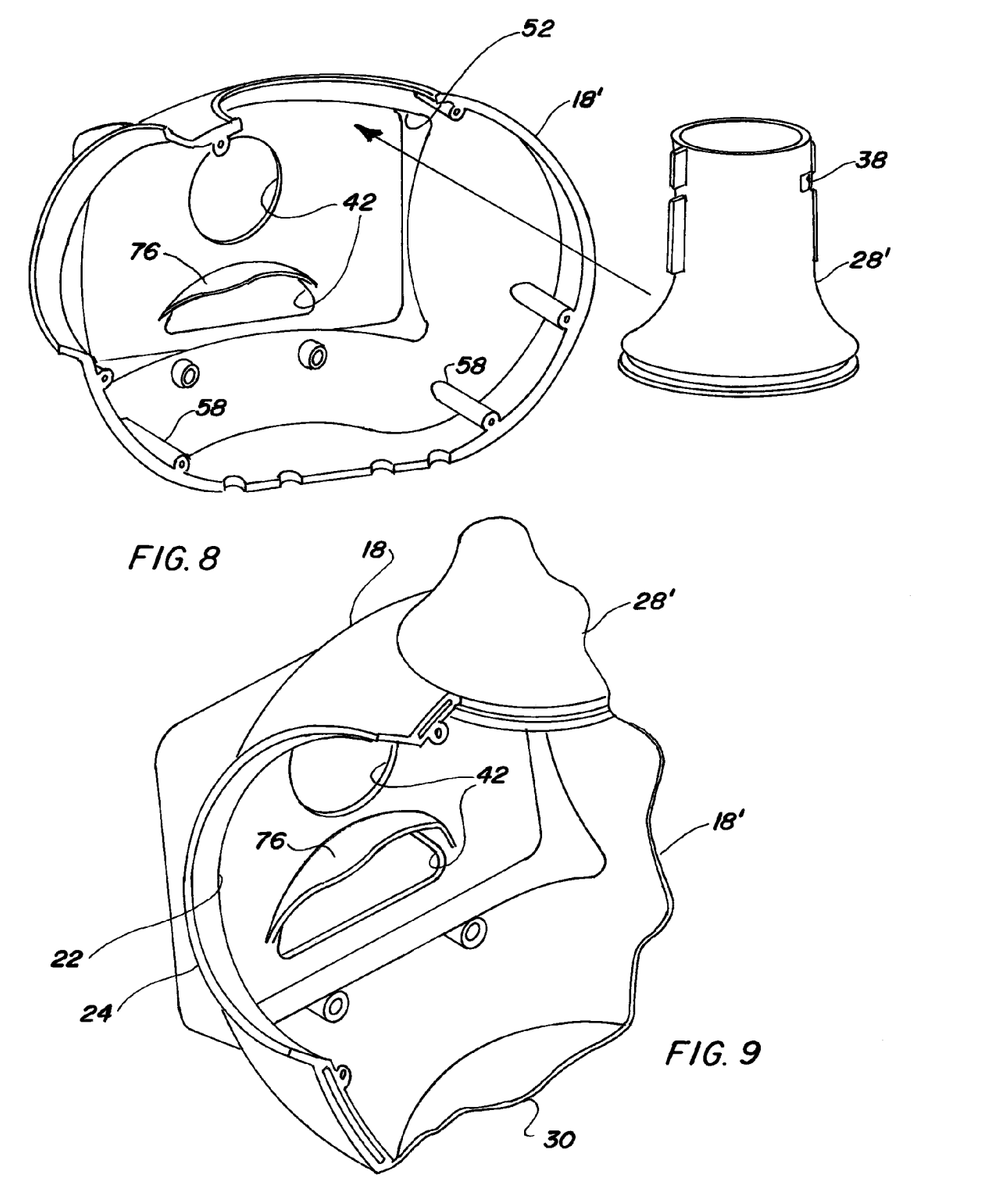

As best seen in FIG. 7, entrance hole 42 may be provided in a bay window structure 52 formed on front half 18. An outer surface 54 (FIGS. 2 and 7) of bay window structure 52 provides a flat surface for assembly of front and rear halves 18, 20 as shown in FIG. 7 or for attachment of separate door assembly 50 as shown in FIG. 1. As shown in FIG. 8, the inside of bay window structure 52 provides an alcove in the nesting compartment. Returning to FIG. 7 taken in combination with FIGS. 2 and 8, it will be understood that front and rear halves 18, 20 may be assembled with screws 56 which are received in integrally formed receptacles 58 provided on the inside of front and rear halves 18, 20.

Figure 4:
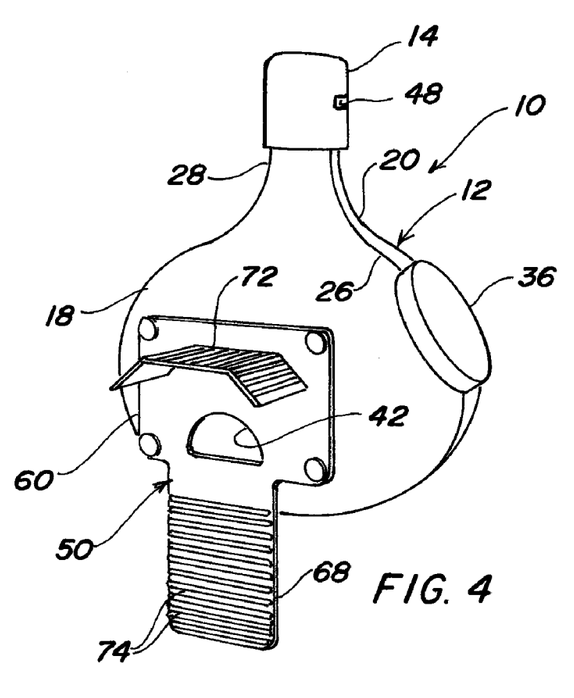
FIG. 4 is a perspective view of a gourd in accordance with the present invention with a door assembly including a rain canopy.
Figure 5:
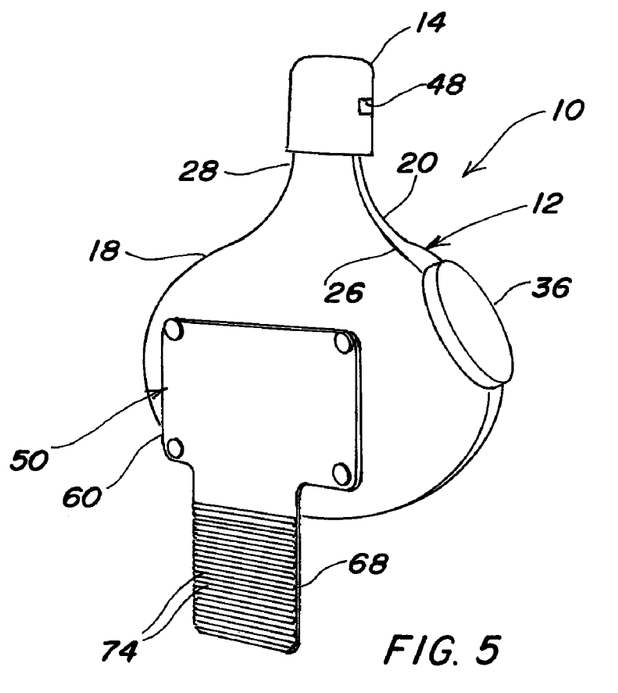
FIG. 5 is a perspective view of a gourd in accordance with the present invention with a door assembly in which the "landlord" may cut a crescent, round, oblong or the like entrance hole to his or her liking.

Various door assemblies 50 may be provided. As shown in FIG. 1, door assembly 50 is formed as a t-shaped plate 60. The upper end of plate 60 is generally rectangular for attachment to flat outer surface 54 of bay window structure 52 which includes a large opening 62 (FIG. 2). This attachment may be made with button head fasteners 64 or with other suitable attachment means as will occur to those skilled in the art. A separate (or integrally formed) porch 66 may also be attached to plate 60 and front half 18. When door assembly 50 does not include a porch as shown in FIGS. 2 and 4-5, a stem of t-shaped plate 60 may serve as a tail prop 68 during ingress of a purple through entrance hole 42.

Figure 6:
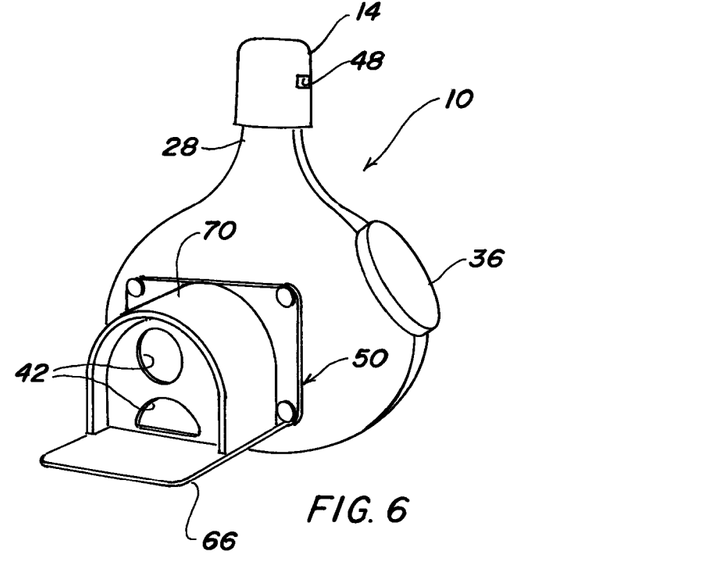
FIG. 6 is a perspective view of a gourd in accordance with the present invention with a door assembly including a tunnel.

Entrance hole 42 may take various shapes. For example as shown in FIG. 4, entrance hole 42 is generally crescent shaped. In other instances, a round entrance hole may be used in place of the crescent shaped hole or provided as a second option to the purple martins as shown in FIGS. 1-2, 6 and 8-9. Other variations may also be provided. For example as shown in FIG. 6, door assembly 50 may have a porch 66 and a tunnel 70 but no tail prop 68. As shown in FIG. 4, door assembly 50 may also include a rain canopy 72. For do-it-yourself "landlords" upper end of plate 60 may be left blank such that the proprietor may cut whatever shape of hole he or she thinks best excludes starlings and other undesired tenants. Porch 66, tail prop 68 and rain canopy 72 may be corrugated 74 (FIGS. 1 and 4-5) or otherwise texturized such that the purple martins do not slip.

Referring now to FIGS. 8-9, it is seen that entrance hole 42 may be integrally formed in bay window structure 52 and not provided as part of a separate door assembly 50. The drawings also show an interior canopy 76 which may be provided over crescent entrance hole 42. Interior canopy 76 like tunnel 70 as shown in FIG. 6 may cause the purple martins to fold their wings before passing through entrance hole 42 such that they do not become stuck in the hole as sometimes happens in the excitement of defending the nest from a predator.

As illustrated in the drawings with the exception of FIGS. 8-9, neck 28 is integrally formed as a portion of front and rear halves 18, 20. Neck may, however, be molded as a separate element 28'. In which case, an upper end of front and rear halves 18, 20 (18' is illustrated) and a lower end of neck 28' provides a tongue-in-groove joint or the like when the front and rear halves are joined as described above.

Gourd 10 is preferably white or a light pastel color. White is preferred because it reflects the heat better and keeps the habitants cooler. White also looks clean. Gourd 10 is preferably molded from a high-density polyethylene or the like with ultraviolet inhibitors for long life. The invention which is focused on structure, however, is not limited to the particular plastic material or type of plastic material mentioned above.

As shown in FIG. 2, gourd 10 may include inner core 16 which may be formed of the same material as shell 12, or of a different material, but is preferably colored black or another dark color so as to provide a dark nesting compartment. Inner core 16 is divided into a front half 78 and a rear half 80 along a vertical plane which passes through an inspection hole 82 with an outwardly extending collar 84 adapted to abut with collar 24 of shell 12 (FIG. 3). Front and rear halves 78, 80 may have a plurality of outwardly extended ears 86 about the periphery by means of which front and rear halves 78, 80 may be mated with fasteners 64 such as button head dart plastic fasteners. Inner core 16 like shell 12 may have a corrugated 34 or otherwise textured inner surface and includes a generally flattened bottom 88 in which drainage holes 90 are formed in the seam between front and rear halves 78, 80. Drainage holes 90 are positioned such that they are in registry with drainage holes 32 in shell 12 when gourd 10 is assembled. Front half 78 has an arch-shaped aperture with an outwardly extended flange 92 adapted to be received within the alcove of bay window structure 52. A floor 94 of flange 92 may serve as an interior porch facilitating the egress of the resident purple martins. An aperture 96 is provided in the seam between front and rear halves 78, 80 at the top of inner core 16 and ribs 98 may be provided on the outside of back half 80 such that inner core 16 is supported within shell 12 on a combination of ears 86, flange 92, collar 84 and ribs 98. As shown in FIG. 3, air may flow through drainage holes 32 in shell 12, through drainage holes 90 in core 16, out aperture 96, up neck 28 and through air space 46 between ribs 44 under cap 14. Some of the air may also flow between the outer wall of inner core 16 and the inside wall of shell 12, also passing under cap 14 as described above.

In use, if inner core 16 is used it may be assembled as described above and fitted within front and rear halves 18, 20 of shell 12. Shell 12 is then assembled with screws 56 as shown in FIG. 7 while resting on outer surface 54 of bay window structure 52. When neck 28' is separate, assembly is similar. Cap 14 may then be slip fitted on neck 28, 28' and gourd 10 carried to the place of installation. Since multiple transverse holes 38 are provided in neck 28, 28', gourd 10 may be oriented on wire or rod 40 such that entrance hole 42 faces a clear flight path. Cap 14 is simply rotated on neck 28, 28' bringing the appropriate holes into registry. If a camera is to be installed in the nesting compartment, it is placed in an aperture provided in snap-on cap 36 for inspection hole 22. Since the cap 36 is snapped on, it is easy to maintain the orientation of the camera such that the pictures will be right-side-up. As the season progresses, the "landlord" may make necessary nest checks through aligned inspection holes 22, 82 and at the end of season, the nesting material may be removed through the inspection holes or by disassembly of the gourd if preferred.

The non-slip corrugations 34 on the inside of inner core 16 and on the inside of outer shell 12 when inner core is not use and on porch 66, rain canopy 72 and tail prop 68 are all safety features for the martins. Interior canopy 76, when present, is also a safety feature as is inner porch 94 when inner core 16 is used. With or without inner core 16, ventilation through gourd 10 is good without wetting the nest material.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. A plastic artificial gourd for use as a nesting place for purple martins, said gourd comprising an outer shell with a front half and a rear half divided by a vertical plane, said halves mated together along the vertical plane, said gourd having a flattened bottom with a plurality of drainage holes and a neck, said interior of the gourd textured to provide baby purple martins good footing and said front half having an entrance hole for the martins, wherein the vertical plane passes through an inspection hole and the neck has a first transverse hole through adapted for passing a wire or rod for hanging the gourd, a cap fits over the neck and the neck has a plurality of ribs which provide an air space between the cap and the neck when the cap is installed on the neck, and a second transverse hole is formed in the neck orthogonal to the first transverse hole and the cap has a transverse hole adapted to be brought into alignment with the first transverse hole or the second transverse hole and through which a rod or wire passes for hanging the gourd.

2. The artificial gourd of claim 1 wherein a canopy is formed over the entrance hole on the inside of the front half of the outer shell.

3. The artificial gourd of claim 1 wherein the vertical plane passes through an inspection hole and the neck has a first transverse hole through adapted for passing a wire or rod for hanging the gourd, a cap fits over the neck and the neck has a plurality of ribs which provide an air space between the cap and the neck when the cap is installed on the neck, and a second transverse hole is formed in the neck orthogonal to the first transverse hole and the cap has a transverse hole adapted to which may be brought into alignment with the first transverse hole or the second transverse hole and through which a rod or wire may be passed passes for hanging the gourd.

4. The artificial gourd of claim 1 wherein the inspection hole is generally oval in shape and large enough to admit a human hand and is covered with a snap-on plastic cap for ease of making nest checks and installing a video camera.

5. The artificial gourd of claim 1 wherein the entrance hole is provided in a bay window structure formed on the front half of the gourd and said bay window structure has a flat outer surface upon which the gourd may be rested on a horizontal surface for assembly.

6. A plastic artificial gourd for use as a nesting place for purple martins, said gourd comprising an outer shell with a front half and a rear half divided by a vertical plane passing through an inspection hole, said halves mated together along the vertical plane, said gourd having a bottom with a plurality of drainage holes and a neck with a first transverse hole through which a wire passes for hanging the gourd, a cap which fits over the neck, said neck having a plurality of ribs which provide an air space between the cap and the neck when the cap is installed on the neck whereby the gourd is ventilated by the passage of air through the drainage holes out through the air space between the cap and the neck, a second transverse hole is formed in the neck orthogonal to the first transverse hole and the cap has a transverse hole capable of being brought into alignment with the first transverse hole or the second transverse hole and through which a rod or wire passes for hanging the gourd.

7. The artificial gourd of claim 6 wherein said front half having an entrance hole for the martins formed in a bay window structure having a flat outer surface upon which the gourd may be rested on a horizontal surface for assembly.

8. The artificial gourd of claim 7 wherein the entrance hole is formed in a door assembly and the door assembly is attached to the flat outer surface of the bay window structure.

9. The artificial gourd of claim 8 wherein the door assembly is a t-shaped plate with a stem serving as a tail prop.

10. The artificial gourd of claim 8 wherein the door assembly includes a rain canopy over the entrance hole.

11. The artificial gourd of claim 8 wherein the door assembly includes a porch in front of the entrance hole.

12. The artificial gourd of claim 8 wherein the door assembly includes a tunnel.

13. The artificial gourd of claim 7 wherein the interior of the front and rear halves is textured to provide baby purple martins good footing.

14. A plastic artificial gourd for use as a nesting place for purple martins, said gourd comprising an outer shell with a front half and a rear half divided by a vertical plane, said vertical plane passing through an inspection hole, said halves mated together along the vertical plane, said front half having an entrance hole for the martins, said outer shell having a bottom with a plurality of drainage holes and a neck, said gourd further including an inner core with a front half and a rear half divided by a vertical plane, said inner core having an inspection hole aligned with the inspection hole in the outer shell and an entrance hole aligned with the entrance hole in the outer shell.

15. The artificial gourd of claim 14 wherein the inner core has a bottom with drainage holes in alignment with the drainage holes in the outer shell.

16. The artificial gourd of claim 15 wherein an aperture is formed in a top of the inner core through which air may pass into the outer shell through the drainage holes in the outer shell and the drainage holes in the inner core.

17. The artificial gourd of claim 16 wherein the inner core is a dark color and the outer shell is white and wherein an interior of the inner core is textured to provide baby martins good footing.

18. A plastic artificial gourd for use as a nesting place for purple martins, said gourd comprising an outer shell with a front half and a rear half divided by a vertical plane, said halves mated together along the vertical plane passing through an inspection hole, said front half having an entrance hole for the martins formed in a bay window structure on the front half of the outer shell, said outer shell having a bottom with a plurality of drainage holes and a neck, said gourd further including an inner core with a front half and a rear half divided by a vertical plane, said inner core having an inspection hole aligned with the inspection hole in the outer shell and an entrance hole aligned with the entrance hole in the outer shell.

19. The artificial gourd of claim 18 wherein the bay window structure has a flat outer surface and an alcove on the inside, said inner core having an arch shaped flange with a floor around the entrance hole in the inner core, said flange fitted into the alcove of the outer shell with the floor of the flange providing an inner porch for the martins.

20. The artificial gourd of claim 18 wherein the inner core has a bottom with drainage holes in alignment with the drainage holes in the outer shell and wherein an aperture is formed in a top of the inner core through which air may pass into the outer shell through the drainage holes in the outer shell and the drainage holes in the inner core.

21. The artificial gourd of claim 18 wherein the neck has first and second orthogonal holes capable of passing a wire or rod for hanging the gourd.

22. The artificial gourd of claim 21 further including a cap which fits over the neck, said neck having a plurality of ribs which provide an air space between the cap and the neck when the cap is installed on the neck whereby the gourd is ventilated by the passage of air through the air space between the cap and the neck, said cap further including a transverse hole capable of being brought into alignment with the first transverse hole or the second transverse hole in the neck and through which a wire or rod passes for hanging the gourd.

* * * * *